United States Patent [19]
Dean et al.

[11] 3,910,747
[45] Oct. 7, 1975

[54] APPARATUS HAVING IMPROVED SHEET CLAMPING MEANS FOR FORMING PLASTIC SHEETS

[75] Inventors: Donald E. Dean, San Pedro; John Alesi, Jr., Topanga, both of Calif.

[73] Assignee: Formex Manufacturing, Inc., Venice, Calif.

[22] Filed: Sept. 23, 1974

[21] Appl. No.: 508,703

[52] U.S. Cl. .......................... 425/397; 425/DIG. 48
[51] Int. Cl.² ......................................... B29C 17/04
[58] Field of Search ............. 425/397, 810, DIG. 48

[56] References Cited
UNITED STATES PATENTS

| | | | |
|---|---|---|---|
| 2,700,179 | 1/1955 | Benson | 425/DIG. 48 |
| 3,025,566 | 3/1962 | Kostur | 425/DIG. 48 |
| 3,176,349 | 4/1965 | Meisner et al. | 425/DIG. 48 |
| 3,193,881 | 7/1965 | Kostur | 425/DIG. 48 |
| 3,787,158 | 1/1974 | Brown et al. | 425/397 X |
| 3,862,815 | 1/1975 | Roczynski et al. | 425/810 X |

Primary Examiner—J. Howard Flint, Jr.
Attorney, Agent, or Firm—Fulwider, Patton, Rieber, Lee & Utecht

[57] ABSTRACT

Improvements in thermoplastic sheet edge clamping means useful in a vacuum forming machine are disclosed. The clamping means are carried on spaced apart, open frameworks used for transferring thermoplastic sheets between heating and molding stations, for positioning the sheets at these stations and for removing molded product from the molding station of the vacuum molding machine. The sheet edge clamping means have piston and cylinder actuators with conduit means extending from an actuator valve and pressure fluid supply and with a piston bypass conduit on at least one of the actuators whereby a continuous bleed of pressure fluid can be circulated through the actuators. This continuous circulation of fluid cools the actuators when the frameworks are in the heating station and thereby avoids unintentional release of the sheets by failure of the actuators.

11 Claims, 24 Drawing Figures

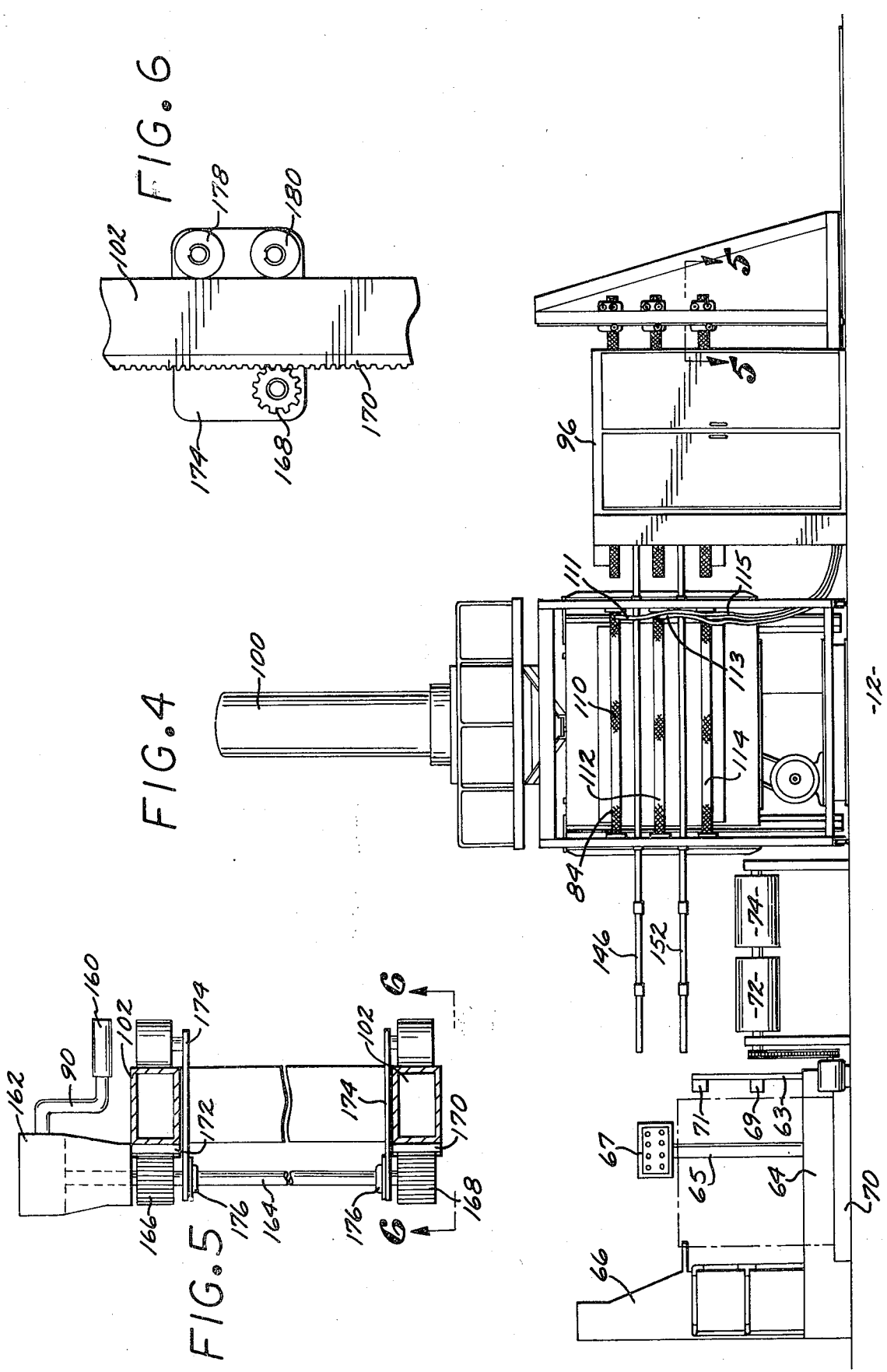

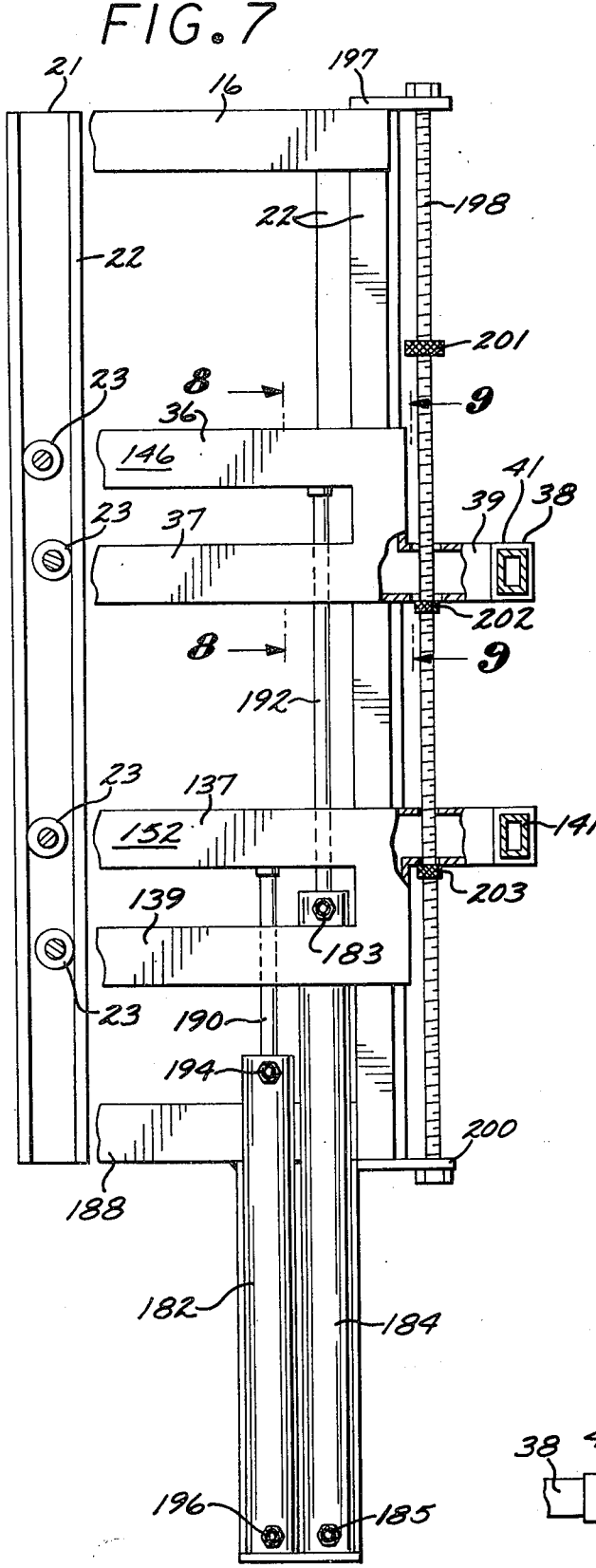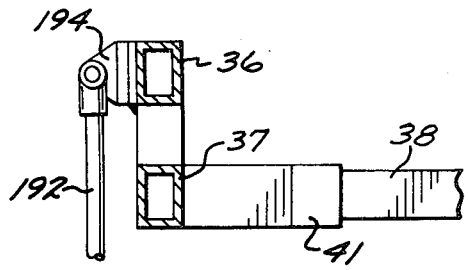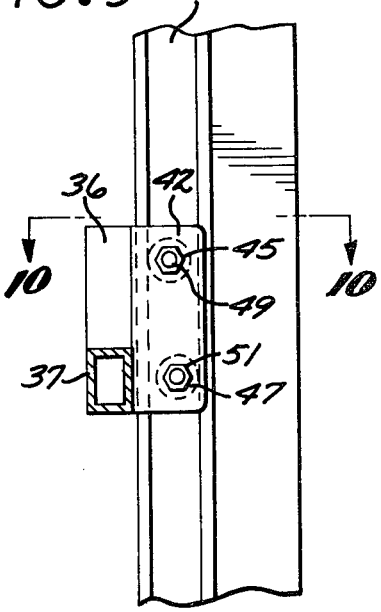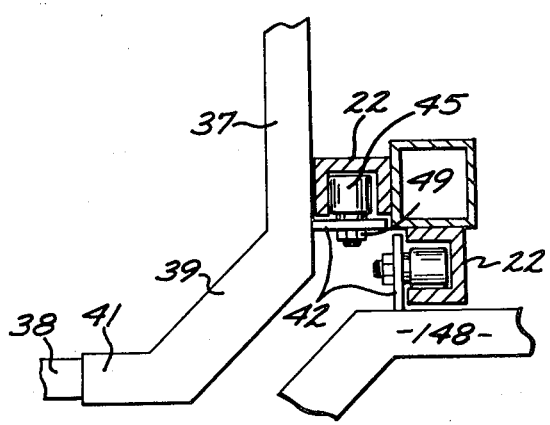

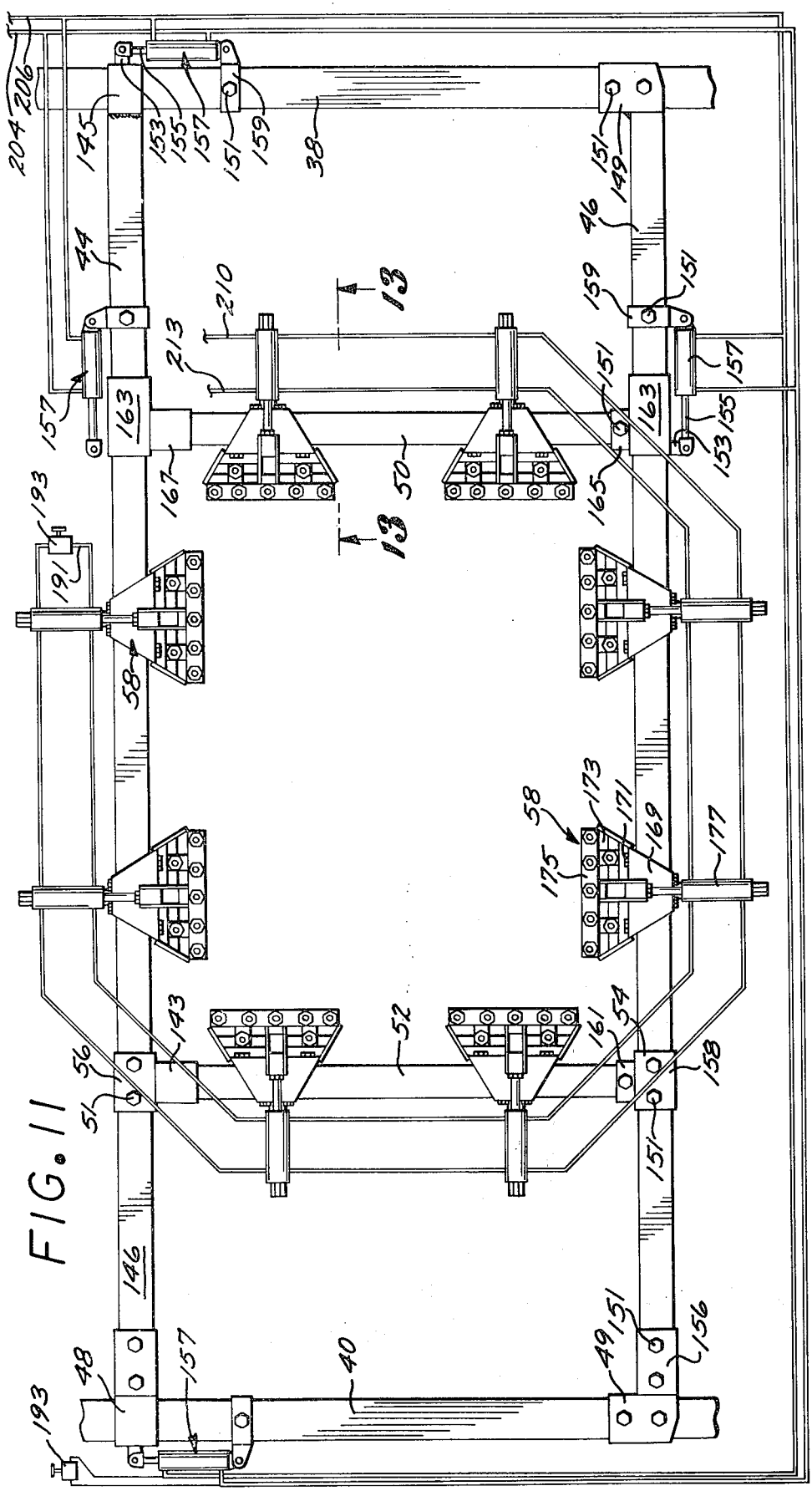

APPARATUS HAVING IMPROVED SHEET CLAMPING MEANS FOR FORMING PLASTIC SHEETS

BACKGROUND OF THE INVENTION

1. Field of the Invention

This invention relates to an apparatus for the forming of substantially complete enclosures from thermoplastic sheet material by vacuum molding.

2. Description of the Prior Art

Vacuum forming is a well known and commonly employed method for the forming of hollow articles from thermoplastic sheet material. The method is commonly employed for the fabrication of flat and irregularly shaped objects of relatively uniform wall thicknesses. A recent development in the field of vacuum forming is double forming wherein the molding is performed in vertically spaced apart mold halves that are mounted on moveable platens of a hydraulic or pneumatic press.

The thermoplastic sheets are moved into molding and heating stations and contact with the die faces of the mold halves by supporting them on upper and lower open frameworks which are provided with transfer means for effecting horizontal movement into and out of the molding station and vertical transport means for positioning the sheets at each station, e.g., for lowering the thermoplastic sheets into contact with the die faces of the mold halves.

The thermoplastic sheets are secured in the open frameworks by clamping means. Desirably, the clamping means are remotely actuated and, to this end, pneumatic piston and cylinder assemblies would be quite useful. Unfortunately, the high temperatures encountered at the heating stations present a severe operational environment and cause frequent failures in such actuators.

SUMMARY OF THE INVENTION

The present invention provides an improved sheet edge clamping assembly for securing thermoplastic sheets in the frameworks used for transferring and positioning the sheets in a vacuum-forming machine. The clamping assemblies have piston and cylinder actuators which are provided with a pressure fluid for remote operation. The pressure fluid supply conduits to the actuators have selector valve means to exhaust pressure fluid continuously from the actuators with piston by-pass and bleed valve means whereby a continuous flow of pressure fluid can be maintained through the actuators in an amount sufficient to maintain the actuators at acceptably low operating temperatures. The invention also provides the clamping assemblies as modular units which can be mounted on an open frame work in fixedly adjustable positions, thereby providing facile changing of the molding machine to handle thermoplastic sheets of varied dimensions.

BRIEF DESCRIPTION OF THE DRAWINGS

The invention will be described by reference to the illustrated and presently preferred embodiment thereof. These illustrations are as follows:

FIG. 4 is another side elevation of the molding apparatus;
FIGS. 5 and 6 illustrate the means for the vertical adjustment of the heating elements of the heating assembly;
FIGS. 7–10 illustrate the track and carriage means of the transport mechanism whereby the sheet supporting open frameworks are vertically adjustable;
FIGS. 11 and 12 illustrate the open frameworks used for supporting the thermoplastic sheets.

DESCRIPTION OF THE PREFERRED EMBODIMENTS

Figure 1:
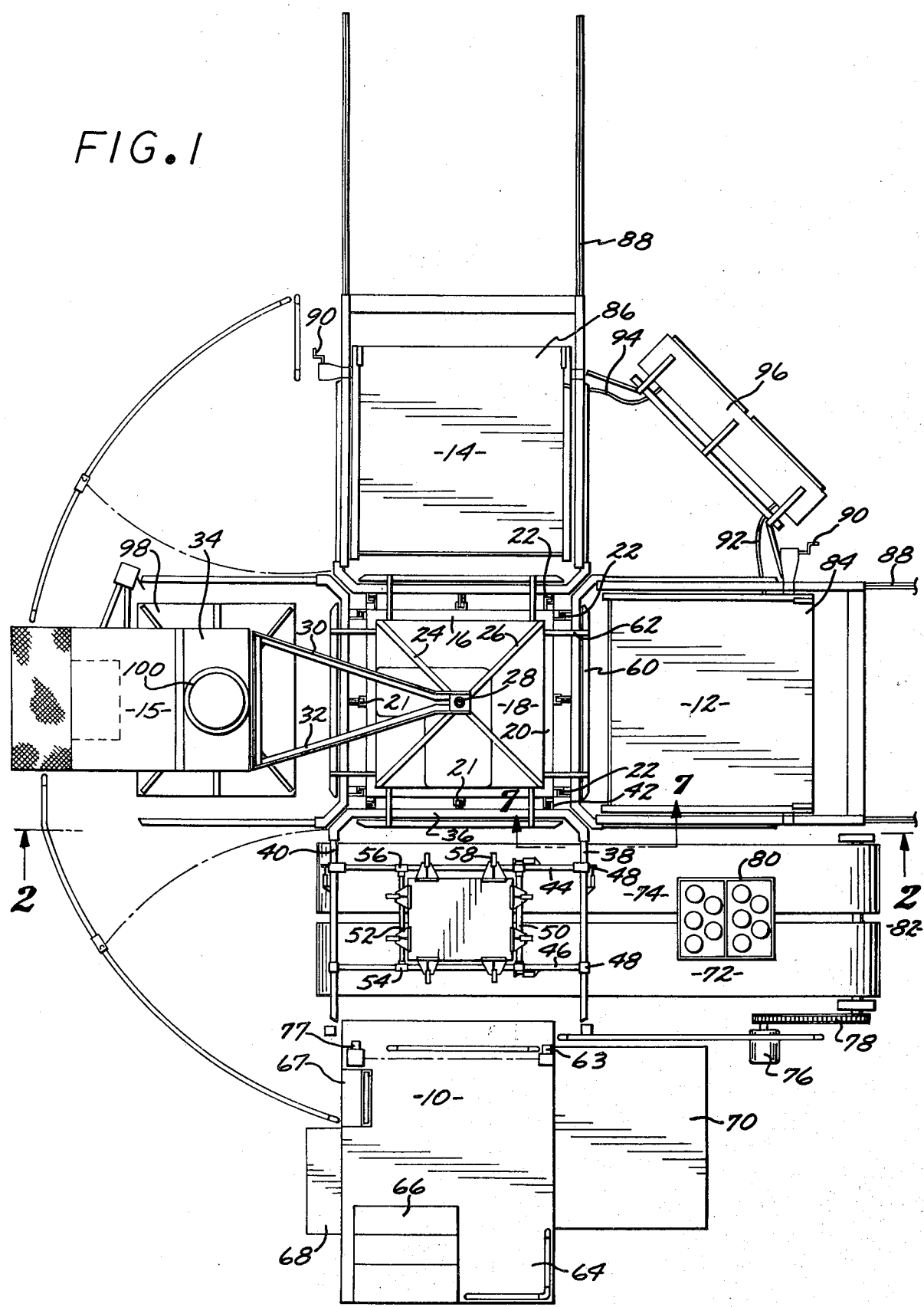
FIG. 1 is a plan view of the molding apparatus.

Referring now to FIG. 1, the molding apparatus can be seen to comprise a loading-unloading station 10, heating stations 12 and 14 and a molding station 15. These stations are radially disposed about a central transport mechanism in the form of a rotary carousel. The carousel has a central frame 16 which is mounted upon a turntable 18; the central core of the carousel is formed by upper and lower, generally square, horizontal frames 20 which bear two upright channel members 22 at each corner thereof and a central, upright channel 21. The horizontal frames are internally braced by cross members 24 and 26. The upper cross members support a central shaft 28 that is mounted in a bearing carried by frame arms 30 and 32 which are attached to a stationary structure such as the upper front face of press 34 that is positioned in the molding station 15.

The upright channels 21 and 22 form vertically disposed track means in which are mounted the carriages that support the open frameworks which support and carry the thermoplastic sheets. A typical carriage assembly is illustrated in the loading-unloading station 10. This carriage assembly can be seen to be formed of a major cross arm 36 to which are secured two, radially dependent, main frame arms 38 and 40. The crossarm 36 supports the carriage by a vertical flange 42. A plurality of such carriage assemblies are employed in vertically spaced apart positions on each side of the four-sided carousel frame 16.

The main frame side arms 38 and 40 support longitudinal frame members 44 and 46 which are attached to the main frame arms 38 and 40 by suitable bracket means 48 which are slideably mounted on the frame arms and which bear clamping means for the fixed adjustability of the position of the longitudinal members on the frame arms. The longitudinal frame members, in turn, support a pair of cross arms 50 and 52 which are mounted thereon by brackets 54 and 56 which are slideably engaged with the longitudinal frame members and which bear lock means whereby the positions of the crossarms 50 and 52 in the assembly can be fixedly adjusted.

The longitudinal members 44 and 46 and the crossarms 50 and 52 bear modular clamp assemblies 58 at a plurality of positions thereon and these clamp assemblies are effective in securing the peripheral edges of thermoplastic sheets which are placed in the open frameworks and carried thereon during the transfer and transport operations of the apparatus.

The carousel frame 16 is covered with a plurality of side panels 60 that are secured thereto by brackets such as 62 which extend from the upper edges of the upright panels 60 to the supporting main frame members 20.

The loading-unloading station of the apparatus comprises a horizontal platform 64 which has a control console 66 housing the operative controls for the apparatus. The platform is raised above the floor elevation and suitable steps 68 can be provided for access to the platform. Adjacent to the platform is a stack of thermoplastic sheets 70 from which the operator can withdraw the sheets for loading in the open framework assembly.

Directly beneath the open frameworks at the loading-unloading station is suitable conveyor means such as conveyor belts 72 and 74 which are driven by conveyor motor means 76 that is coupled by belt 78 to the common drive shaft of the conveyor belts. Molded products which are ejected from the open frameworks in the manner hereinafter described, fall onto conveyor belts 72 and 74 and are transported therefrom, as shown for molded product 80, to a suitable handling station 82.

The molding apparatus has heating stations 12 and 14 which are provided with heater assemblies 84 and 86 which are moveably mounted by suitable carriage means on tracks 88 in the manner hereinafter described. The heaters have a plurality of vertically spaced apart heating elements and the vertical positions of these heating elements can be fixedly adjusted by the crank means 90 shown to one side of each of the heating assemblies. The energy for the heating elements can be furnished by any suitable means; a preferred and convenient source is electrical power which is supplied to the heating assemblies by flexible electrical conduits 92 and 94 which extend from the electrical connector and fuse panel cabinet 96 to the heater assemblies 84 and 86.

A hydraulic press 34 is located in the molding station. This press has a moveable upper platen 98 carried by the hydraulic ram that is reciprocal within the power hydraulic cylinder 100 at the top of the hydraulic press.

Figure 2:
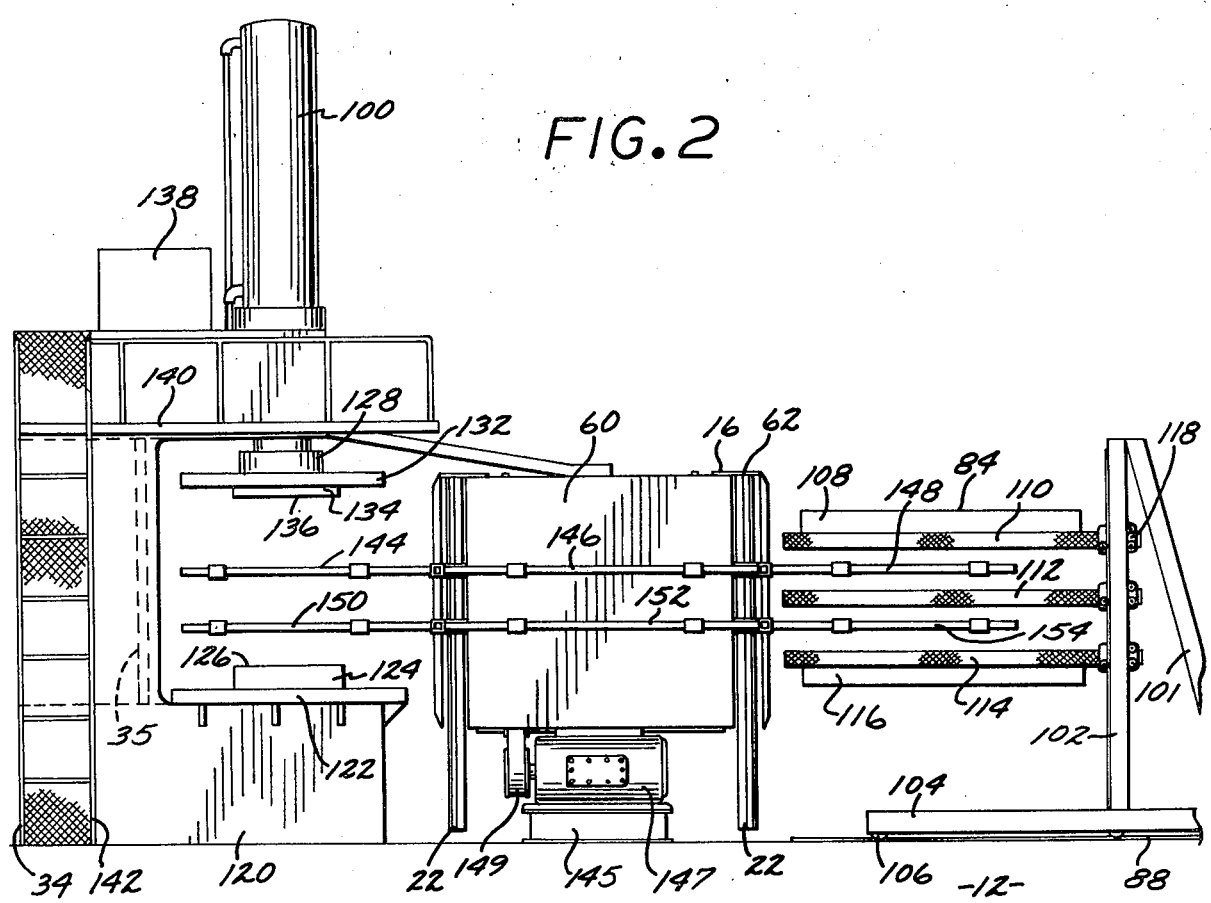
FIG. 2 is an elevation view of the molding apparatus.

Referring now to FIG. 2, the heater and press apparatus will be described in greater detail. The heater assembly 84, shown to the right of FIG. 2, can be seen to comprise a supporting framework of vertical standards 101 and 102 mounted on a platform base 104 which bears wheels 106 that are mounted on tracks 88. The heater assembly has an upper cover plate 108 and a plurality of vertically spaced apart heating elements 110, 112 and 114 with a suitable lower cover 116. Preferably, covers 108 and 116 are thermally insulated to avoid unnecessary heat losses. The heating elements are carried on vertically adjustable carriage means 118, which are described in greater detail with reference to FIGS. 5 and 6 hereafter.

The hydraulic press can be seen to comprise a lower, stationary base 120 on which is mounted fixed platen 122 that bears the lowermost mold half 124 having an upwardly directed die face 126 with an intaglio pattern of the desired product shape. The press frame has a surmounting upper arm 130 which supports the hydraulic cylinder 100 in which is mounted reciprocal ram 128. This ram carries the upper platen 132 on which is mounted the upper mold half 134 having a die face 136 which bears an intaglio pattern of the upper side of the desired product. The hydraulic press is provided with a conventional hydraulic power unit 138 and has a surrounding catwalk 140 with a suitable ladder 142 that leads to the catwalk.

The rear of press 34 is open for access to the mold halves during the molding process. It is frequently desirable to insert a preformed article between the upper and lower thermoplastic sheets such as a honeycomb or foam shape. This can be accomplished by vacuum forming the upper and lower sheets on their respective die faces and then inserting the preformed article before the press closes. A safety gate 35 is provided to close the access at the rear of the press and suitable switch means are provided which interrupt the press action if the gate is not closed.

The thermoplastic sheet transporting mechanism for the apparatus can be seen in the center of FIG. 2. The entire transport mechanism is supported on base 145 on which is mounted a conventional rotary index table mechanism that is commercially available as a Ferguson drive unit. This drive unit has an electrical motor 147 with suitable belt means 149 extending to a shaft that drives cams which are operable to rotate rotary table 18 that supports the central carousel framework 16. As previously described, the framework supports, at each corner, upright channel members 22 which form vertical track means for the carriage assemblies secured to the open frameworks. A plurality of vertically spaced apart open frameworks are shown, the uppermost frameworks being identified as 144, 146 and 148 and the lowermost frameworks being identified as 150, 152 and 154. FIG. 2 also shows the vertical cover sheets 60 which are supported by hangers 62 from the top of the carousel framework and which cover the interior of this framework.

Figure 3:
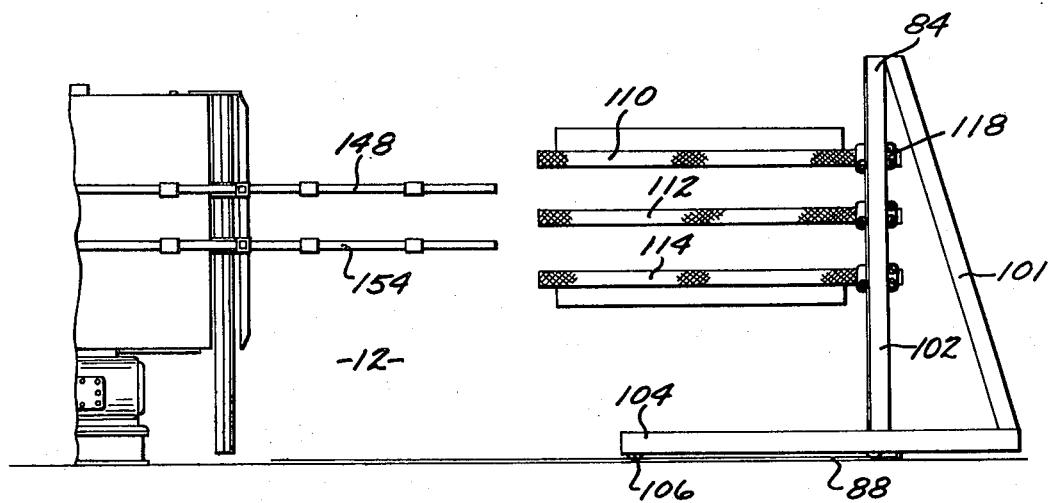
FIG. 3 is an illustration of the heater assembly as withdrawn from the heating station.

One of the safety features of the apparatus comprises the moveable heater assemblies such as 84 which is shown in FIG. 2 in the heating station 12. In the event that a malfunction occurs which interrupts the movement of the rotary carousel, the heater assemblies can be immediately withdrawn from the heating station in the manner illustrated in FIG. 3. As illustrated, the heater assembly 84 has been moved away from the heating station 12 and the heating elements 110, 112 and 114 have thus been withdrawn from proximity to the thermoplastic sheets that are carried in the open frameworks such as 148 and 154. As previously mentioned, the heater assembly is carried on the carriage formed by the upright standards 101 and 102 that are secured to platform base 104 which bears wheels 106 that are mounted on the track 88 whereby the heater assembly can be retracted from the heating station in the event of a malfunction of the apparatus. This insures that the thermoplastic sheets that are carried on the open frameworks 148 and 154 are not heated to excessive temperatures that could cause charring or combustion of the material or that could cause the sheets to sag into contact with heater elements 112 and 114.

The heater elements, as illustrated, comprise conventional resistance heaters that are supplied with electrical power from electrical conduits 92 and 94 which extend from the electrical control and connector panels that are housed in cabinet 96. The conduits connecting the heater elements to this panel are flexible, thereby permitting the movement of the heater assemblies when necessary. Each of the heaters 110, 112 and 114 are mounted on the upright standards 101 and 102 by carriage means permitting a fixed adjustability in the vertical position of the heating elements. The carriage means 118 are illustrated in greater detail in FIGS. 5 and 6.

FIG. 5 illustrates the crank means 90 whereby the vertical position of the heating elements can be fixedly adjusted. The crank means comprises a conventional roller crank 160 which extends from a crank housing 162 that contains suitable gear means for effecting rotational movement of shaft 164. Shaft 164 bears pinions 166 and 168 that mesh with vertical racks 170 and 172 which are carried to one side of each of the vertical standards 102 that are positioned at opposite sides at the rear of platform base 104. The construction of the carriage and its operation will be more apparent from FIG. 6 which illustrates that the carriage is formed with brackets 174 at each side of the assembly. The shaft 164 is supported by suitable bearings 176 (shown in FIG. 5) carried on brackets 174. Each bracket 174 also supports a pair of roller or idler wheel means 178 and 180 that are mounted in rolling contact with the opposite sides of the upright standards 102.

FIG. 4 is a view of the molding apparatus from the rear of the first heating station 12. In this view, the raised platform 64 of the loading-unloading station is illustrated with the stack 70 of the thermoplastic sheets shown in broken lines. The control console 66 of the instrument is shown at the extreme left of FIG. 4 with a sub-control console 67 illustrated as supported by post 65. Open frameworks 146 and 152 are shown at the loading-unloading station positioned above the conveyors 72 and 74.

Safety interlock means are provided on platform 64 since the open frameworks, such as 146 and 152, swing over the platform during the transfer operation. To insure that an operator is not in the path of the open frameworks, one or more combinations of a photocell and lights are provided. These are shown as lights 69 and 71 which are positioned at knee and chest heights on standard 63 and opposite photocells on standard 77 at opposite sides of the platform. The photocells are connected to a relay in the electrical circuit to motor 147 to open the circuit in the event that either light beam between the lights and photocells is interrupted.

The heater elements 110, 112 and 114 of the heater assembly 84 are shown in electrical connection with flexible conduits 111, 113 and 115 which are combined in a single conduit 92 that extends to the electrical cabinet 96 in which are housed the fuse and terminal connector panels for the apparatus.

The carriage means whereby the open frameworks are mounted in vertically moveable positions on the central carousel are illustrated in FIGS. 7–10. As shown in FIG. 7, the upright channels 22 are carried at each corner of the central carousel 16. The view shown in FIG. 7 is a view along lines 7—7 of FIG. 1 and illustrates a partial sectional elevation view of the carriage assembly. The upper open frameworks 146 is shown as formed with dual, parallel cross members 36 and 37. The lowermost member 37 is formed with an angle leg 39 and a short open end 41 from which extends the main frame arm 38. The lowermost frameworks 152 is similarly formed with a pair of parallel bars 137 and 139 and a main frame arm 141.

The open frameworks are vertically adjustable on their supporting central framework 16. This capability is provided by carriage means operative in the track formed by the channel members 22 in the manner shown in FIGS. 9 and 10. The cross arms 36 and 37 are shown to bear dependent flanges 42 on which are rotatably supported a pair of rollers or idler wheels 45 and 47 which are mounted in stub shafts that are secured to the flange by nuts 49 and 51. One of the four rollers for each frame can be mounted on an eccentric for accurate, four point alignment of these rollers in their respective tracks. The construction of these elements is shown in greater detail in FIG. 10 which also illustrates the adjacent upright channel 22 in which is mounted the carriage means of the adjacent open frameworks such as 148. Centrally positioned on each face of the supporting frameworks 16 is a guide means in the form of a vertical channel 21. The open slot or face of this channel forms a vertical track in which are inserted rollers 23 which are rotatable carried by each of the horizontal cross arms of each open frameworks, e.g., by cross arms 36 and 37 of open frameworks 146 and cross arms 137 and 139 of open frameworks 152. The central channel and associated rollers maintain the horizontal position of the open frameworks.

The vertical transport mechanism for the open frameworks also includes suitable actuating means which are shown as assemblies of reciprocal pistons and cylinders 182 and 184, a pair of which is provided at each side of each of the open frameworks assemblies. These actuators are carried on the central carousel frame and, to this end, the bases of the cylinders are mounted in a suitable surrounding frame 186 that is secured to the lower bars 188 of the central carousel framework. As shown in FIG. 8, the piston rods 190 and 192 which extend from the pistons are secured by suitable brackets 194 to the horizontal cross arms, such as 36, of the open frameworks. Disposed at opposite ends of each of the cylinders are ports 194 and 196 and 183 and 185. These ports are connected to conduits which extend, in the manner hereinafter described, to selector valve means operative to connect the conduits to a source of fluid pressure or to suitable exhaust means.

The frameworks' carriages are also provided with a guide means in the form of threaded rods 198 which are secured to the frameworks by brackets 197 and 200. Each threaded rod 198 bears suitable adjustable stop means such as knurled wheels or nuts 201, 202 and 203 which serve as limit stops on the travel of the open frameworks. As illustrated, the upper open framework 146 has large apertures in its main cross frame member 37 which are of sufficient diameter to pass over stop nut 202 but which are retained by the larger stop nut 201. The lower framework 152 has apertures in its horizontal bar member which are insufficient to clear nuts 202 and 203, and the latter, therefore, serve as adjustable stops whereby the limit of vertical displacement of the open frameworks 152 can be fixedly adjusted.

Each of the open frameworks carry thermoplastic sheet engaging or clamping means whereby a thermoplastic sheet can be supported during its transfer to and between the heating and molding stations and can be supported at these stations. The preferred embodiment of the invention employs modular clamping means which are mounted on the frame members of the open frameworks. These modular clamping means are interconnected with a source of pressure fluid for actuation with conduit means permitting the continuous circulation of the pressure fluid through the cylinder and piston actuators to maintain the actuators cooled during the heating of the thermoplastic sheet.

FIGS. 11 and 12 illustrate the open frameworks assembly, including the sheet edge clamping means carried thereon. Referring now to FIG. 11, the open frameworks, such as 146 is illustrated as mounted on the main frame side arms 38 and 40 that are secured to the rotary carousel 16. These main frame side arms support longitudinal frame members 44 and 46 which are carried on the main frame side arms by support means such as tubular brackets 48, 145, 49 and 149 which slidably engage the main side arms of the frame. One of the longitudinal bars 46, is shown as fixedly secured to the main frame side arms as illustrated in FIG. 12. Also as shown in FIG. 12, the arms of the open frameworks are tubular and, preferably, have a rectangular cross section. The brackets mounted thereon are box-shaped of slightly larger cross sectional area and the longitudinal arm 46 is secured thereto by suitable means such as a weld to bracket 149 or by a dependent side bracket 156 with lock screws 151 as shown for bracket 49.

The opposite longitudinal arm 44 bears, at each of its opposite ends, sliding brackets 48 and 145 and these brackets carry, at their outboard sides, a projecting finger or lug 153 to which is attached a yoke carried by piston rod 155 that projects outwardly from an ejector piston and cylinder actuator assembly 157. The opposite end of the actuator is carried on a sliding bracket 159 which has lock screw 151 whereby the position of sliding bracket 159 on arm 38 may be fixedly adjusted.

Cross arms 50 and 52 are carried by sliding brackets on the longitudinal members 44 and 46. To this end, the cross arms 50 and 52 bear, at their opposite ends, tubular mounting brackets which are sized to fit in sliding engagement about the longitudinal members 44 and 46. Cross arm 52 bears a simple bracket 54 formed by a main tubular member 158 with a second tubular member 161 carried thereon and with a plurality of lock screws 151 carried on these brackets whereby the tubular members within the brackets can be fixedly secured.

The bracket 56 carried at the opposite end of cross arm 52 is similar in construction with the exception that a lock screw 151 is not provided in the side tubular member 143 such that cross arm 52 is reciprocally carried therein.

One of the cross arms 50, as illustrated, carries sliding brackets which are not fixedly secured to longitudinal arms 44 and 46 but are slidably carried thereon. Typically, the brackets have a main tubular portion 163 with a sidedepending tubular bracket 165. One of the brackets carries a lock screw 151 whereby one of the ends of cross arm 50 can be fixedly secured therein. The sidedepending tubular portion 167 of the bracket on the opposite end of cross arm 50 does not carry a lock screw whereby the engaging end of cross arm 50 can be slidably carried therein. Each of the main tubular brackets 163 carries an outboard lug 153 to which is secured the yoke member of a piston rod 155 from a cylinder and piston actuator 157. The opposite end of each of these actuators 157 is attached to sliding bracket 159 that is slidably mounted on its longitudinal arm and that bears lock screw 151 whereby its position on its longitudinal arm can be fixedly adjusted.

The four piston and cylinder actuators are interconnected by flexible conduits to a suitable source of an actuating pressured fluid, e.g., compressed air. Two conduits are provided, 204 and 206, and are connected to ports which are located at opposite ends of the cylinders of the actuators 157 whereby fluid pressure can be applied to either or both sides of the piston carried in the actuator cylinders.

The open frameworks construction as thus described can be seen to comprise an open frameworks which has a limited degree of expandability as determined by the limit of the travel of the piston and cylinder actuators. The supply of a pressured fluid through line 204 will urge the actuators to expand the open frameworks; the fluid actuators 157 secured to longitudinal frame 44 will move this member with its sliding brackets 48 and 145 into an expanded position, apart from longitudinal frame member 46. Similarly, the pressured fluid supplied to the fluid actuators 157 attached to cross arm 50 retracts the pistons in these actuators, thereby moving cross arm 50 away from cross arm 52 and laterally expanding the open space defined with the cross arms. The supply of pressured fluid to conduit 206 effects the opposite movement of these elements, and urges the open frameworks into its most contracted position, as illustrated in FIG. 11.

The modular clamp assemblies 58 are carried on the longitudinal frame members and cross arms of the open frameworks. The assemblies are formed with a main bracket 169 which is defined by an inverted U-bracket or channel bracket which is slidably mounted on the supporting arm and is fixedly secured thereto by lock screws 171. The channel brackets 169 preferably bear a stationary lower jaw in the form of a flat horizontal flange 173 that is secured to suitable actuating means such as the piston and cylinder assembly 177 whereby the upper jaw 175 can be moved into and out of engagement with plastic sheet material resting on the ledge 173 which forms the lower jaw member. The specific construction of these clamp assemblies 58 is described in greater detail hereafter with reference to FIGS. 13–15.

Each of the cylinders of the piston and cylinder actuators 177 has fluid ports at its opposite sides of each cylinder. The ports at each end of the cylinders are all interconnected to a common conduit for supply of pressured fluid; pressured fluid supply conduits 213 and 210 being shown for this supply. At the fluid actuator most removed from the source of supply, i.e., the actuator 179, the opposite ends of cylinder are interconnected by piston by-pass conduit 191 which has suitable fluid flow pressure drop means such as valve 193 whereby a pressure differential can be maintained across the piston in this fluid actuator.

The operation of the clamping means is fairly apparent from the preceding discussion. Fluid pressure, e.g., compressed air, can be applied through conduit 210 to urge the jaws of the clamp assemblies 58 into a closed position. A sufficient pressure drop is taken through valve 193 while still providing a slight fluid flow therethrough, e.g., about 2 standard cubic feet per minute, so as to provide a sufficient, continuous circulation of pressure fluid through the cylinders of the fluid actuators to cool the actuators. The pressure fluid is removed and exhausted through line 213. In this manner, the actuating pressure fluid serves as a coolant to maintain the piston and cylinder actuators at safe operating temperatures during their residence at the heating stations of the molding apparatus. This continuous flow of pressed fluid also maintains a constant pressure in the actuators, thereby insuring a constant clamping force will be exerted on the edges of the thermoplastic sheets carried by the open frameworks throughout the molding process. Since the clamping assemblies are modular assemblies and since the flexible conduits interconnecting these clamping assemblies are removeably attached to their access ports carried on the cylinders of the actuators, the number and spacing of these clamping assemblies can be varied as desired for various sizes and varied strengths of the thermoplastic sheets carried by the open frameworks.

Figure 13:
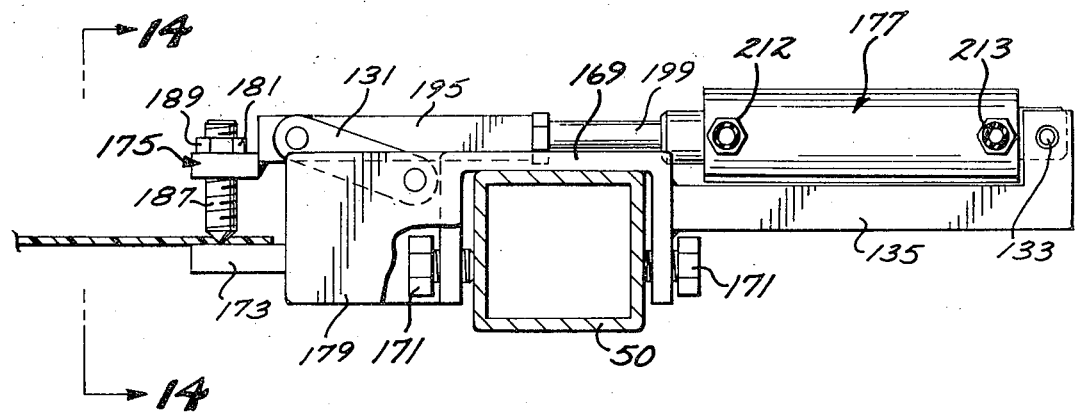
FIGS. 13–15 illustrate the sheet clamping mechanism carried by the open frameworks.
Figure 14:
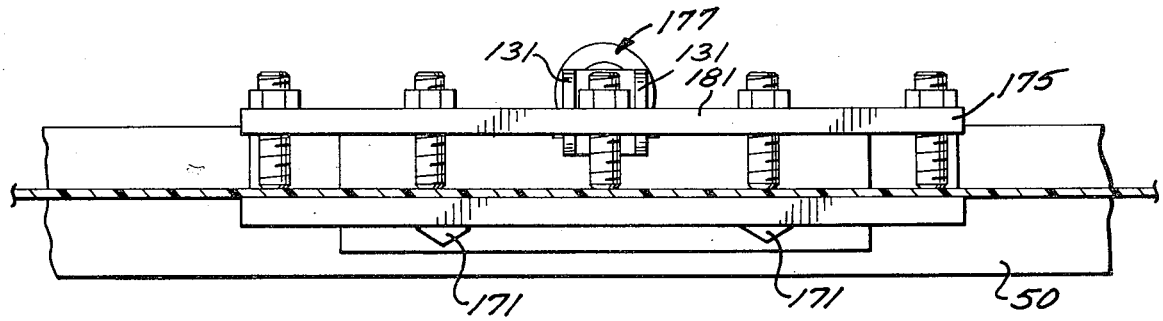
Figure 15:
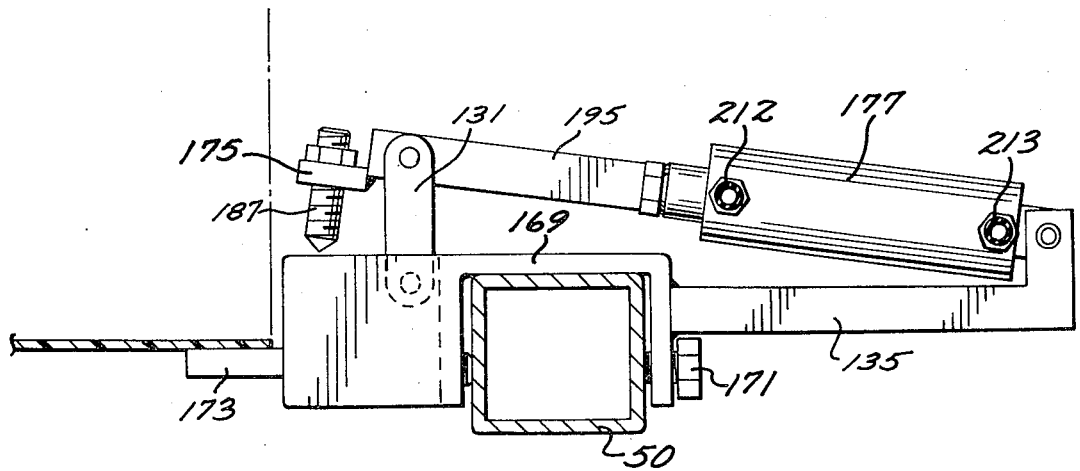
Figure 16:
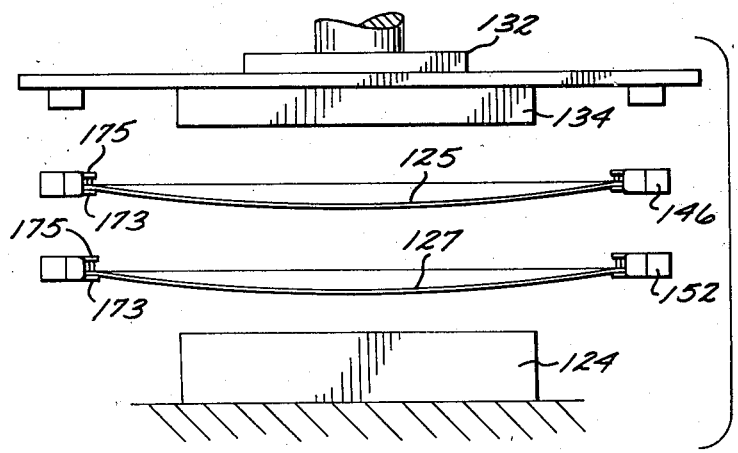
FIGS. 16–23 illustrate the vertical displacements of the open frameworks and mold press during the molding process.

The construction of the clamping assemblies 58 will be more apparent from FIGS. 13–15. The clamping assemblies can be seen to comprise a channel bracket 169 with side flanges which are bored and tapped to receive lock screws 171 that press against the sides of the supporting arm, such as 50, to fixedly secure the assembly on this arm. A flat ledge 173 extends from the inboard side wall of the channel 169 and side walls 179 are welded to the channel member 169 and ledge 173 to brace the ledge in a secure mounting on the channel member 169. The upper jaw 175 of the clamping assembly comprises a generally horizontal bar 181 which has a plurality of tapped bores in which are threadably mounted pins 187 which bear suitable lock means, such as lock nut 189, whereby their positions in the horizontal bar can be fixedly secured. The lower ends of pins 187 are pointed to provide a biting engagement with the thermoplastic sheet resting on ledge 173 as illustrated in FIGS. 13 and 14. At approximately the midpoint of the upper jaw 175, there is rigidly attached an arm in the form of a bar 195 having its center portion bored and tapped to receive the outboard end of piston rod 199 from the actuator assembly 177. The opposite end of the actuator assembly 177 is attached to a generally L-shaped bracket member 135 that is rigidly secured to the outer side wall of the channel member 169. The free end of bracket 135 has an aperture 133 for the pivotal mounting of the actuator assembly 177. The bar 195 is mounted to a pivotal support on channel bracket 169 through a pair of link members 131 disposed to either side of bar 195. The contraction of the piston and cylinder actuator 177 will raise the pins 187 from engagement with the thermoplastic sheet material, and, upon continued contraction of the assembly, the upper jaw 175 will be moved from its vertical position above the lower jaw support ledge 173.

FIG. 15 illustrates the clamp assembly in the opened position which results from contraction of the piston and cylinder assembly. It can be seen in this illustration that the upper jaw 175 has been raised and retracted by rotation of link members 131 about their pivotal support on channel bracket 169. In this position, the full width of the open frame is available for insertion of the thermoplastic sheet material to rest the latter upon the support shelf formed by jaws 173 of the clamp assemblies which are located at spaced apart positions about the open framework.

The sequence of the vertical sheet transferring movement and the movement of the mold halves carried on the molding press will be described by reference to FIGS. 16–23. In the illustration shown in FIG. 16, the hydraulic press 34 is open with its upper platen 132 in its uppermost position supporting upper mold half 134 above lower mold half 124. In this position, the rotary carousel mechanism is operative to transport two vertically spaced apart open frameworks 146 and 152 into vertical alignment between the upper and lower mold halves. In this transferring, the upper and lower open frameworks are spaced apart a predetermined distance, generally from 12 to about 18 inches, so as to maintain the thermoplastic sheets 125 and 127, which are carried thereon, in a spaced apart relationship. This spacing is sufficient to insure that the unavoidable sagging of these sheets when in their heated condition, which typically is of the magnitude illustrated in FIG. 16, will not cause them to contact each other or the heating elements of the heater section. As illustrated, the jaws 173 and 175 of the clamping assemblies are in their closed condition and retain the thermoplastic sheets securely.

Figure 17:
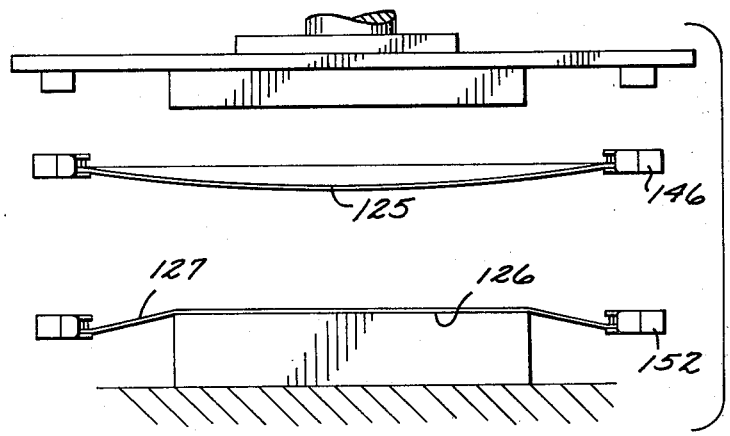

Upon arrival at the molding stations, as shown in FIG. 17, the piston and cylinder assembly 182 (see FIG. 7) for the lowermost frameworks 152 is actuated to lower open frameworks 152 to a vertical position adjacent or slightly subjacent of the lowermost die face 126, thereby covering the die face with the thermoplastic sheet 127. The application of a vacuum to the mold half 124 will, in the conventional manner, draw the thermoplastic sheet 127 into contour conforming contact with the intaglio pattern of the die face 126.

Figure 18:
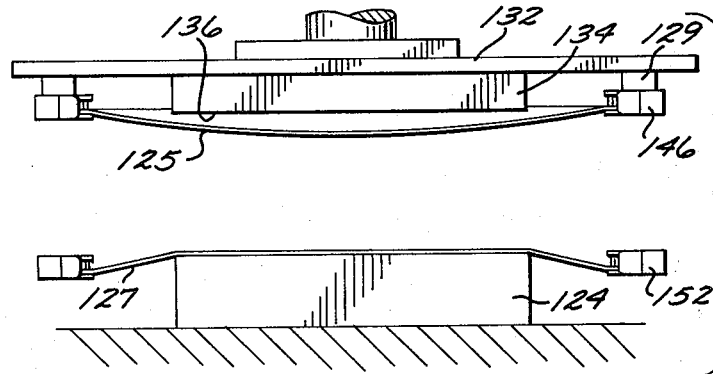
Figure 19:
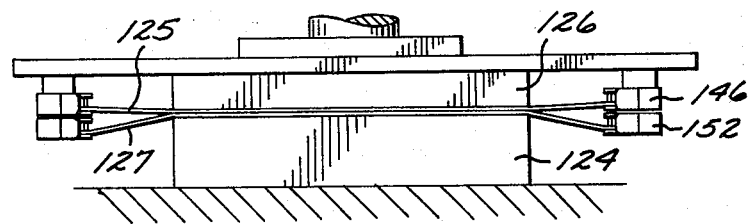
Figure 20:
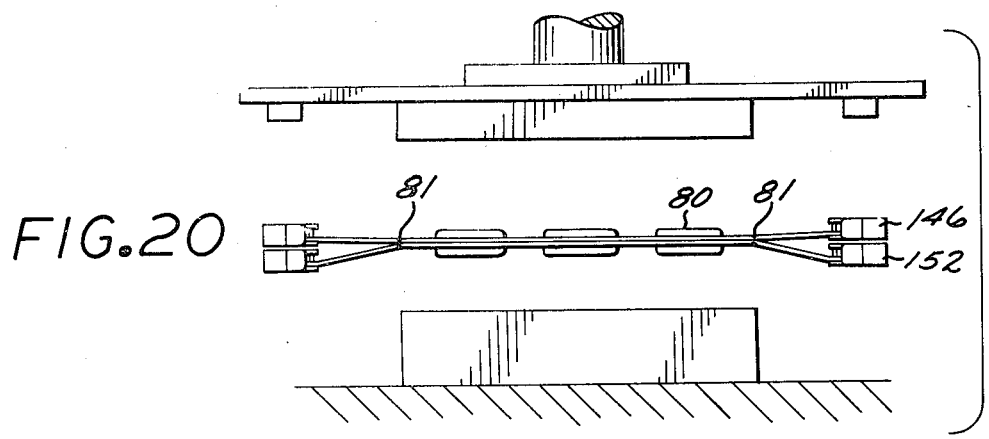

The hydraulic ram is then actuated to lower the upper platen 132, with its associated upper mold half 134, downwardly into proximity of the uppermost open framework 146, as shown in FIG. 18. The upper platen carries blocks or vertical stops 129 which are moved into contact with the frame members of the upper open frameworks 146. A vacuum is applied to the upper mold half 134 to draw the upper thermoplastic sheet 125 into contact with the upper die face 136, drawing this sheet into contour conforming contact with the intaglio pattern carried on this die face. The hydraulic ram may then be lowered to move the upper mold half into landing engagement with the lower mold half 124 as is illustrated in FIG. 19. Hydraulic pressure is applied to the upper ram to force the lands of the upper and lower mold halves together and to form a pinched-off, peripheral tear line extending about the exterior of the molded product formed within the mold.

Upon completion of the molding step, the application of hydraulic pressure to the upper ram is reversed to retract the upper ram and to separate the upper and lower mold halves. This movement of the hydraulic ram is accompanied by the upward movement of the two open frameworks 146 and 152 which move simultaneously by the application of fluid pressure to port 196 of cylinder 182, and to port 185 of cylinder 184 to withdraw the molded product 80 from the mold halves. The tear line of reduced material thickness 81 is shown about the peripheral edges of this molded product. When the open frameworks 146 and 152 have reached an intermediate position between the upper and lower open molds, the rotary carousel 16 is free for rotational transfer of the open frameworks from the molding station to the loading-unloading station.

Figure 21:
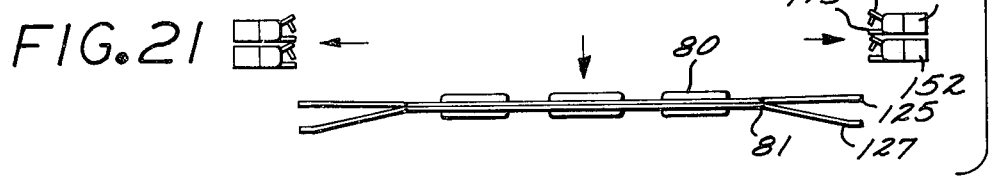
Figure 22:
Figure 23:
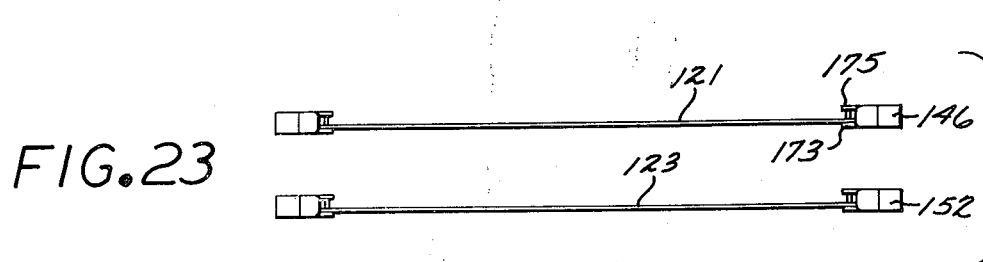

FIG. 21 illustrates the ejection of the product at the loading-unloading station. When the open frameworks reach this station, the jaws of the clamping assemblies are opened by the application of fluid pressure to conduit 213.

Fluid pressure is also supplied to conduit 204 to operate the frameworks actuators 157 and expand the open frameworks 146 and 152 into their expanded condition, freeing the molded product 80 with its peripheral waste sheet material 83 and 85 from the frameworks and permitting the product to fall onto the subjacent conveyor 72 and 74 for removal from the loading-unloading station.

The open frameworks 146 and 152 are then readied for loading of another charge of thermoplastic sheets. This is performed by supplying actuating fluid pressure through conduit 206 which is effective in contracting the open frameworks through the actuators 157 and in applying fluid pressure to port 185 of actuator cylinder 184 to raise the upper open frameworks 146 and move it a substantial distance above the lower open frameowkrs 152, thereby permitting facile access to the frameworks whereby a new thermoplastic sheet 123 can be inserted into the open frameworks in the manner illustrated in FIG. 22.

When a thermoplastic sheet 123 has been placed in the lower, open frameworks 152 and rests on the lower jaws or ledges 173, the clamping assemblies on this frameworks are closed. The upper, open frameworks 146 can be lowered into its transferring position which is a slight and fixed predetermined vertical distance above the lowermost open framework 152. The upper thermoplastic sheet material 121 can then be placed in the open frameworks 146 and actuating fluid pressure can be applied through conduit 210 to urge actuators 177 of clamp assemblies 58 into an extended position, closing jaws 175 securely against the lower ledges 173 in the manner illustrated in FIg. 23. The thermoplastic sheets are then ready for transfer to the heating and molding stations.

Figure 24:
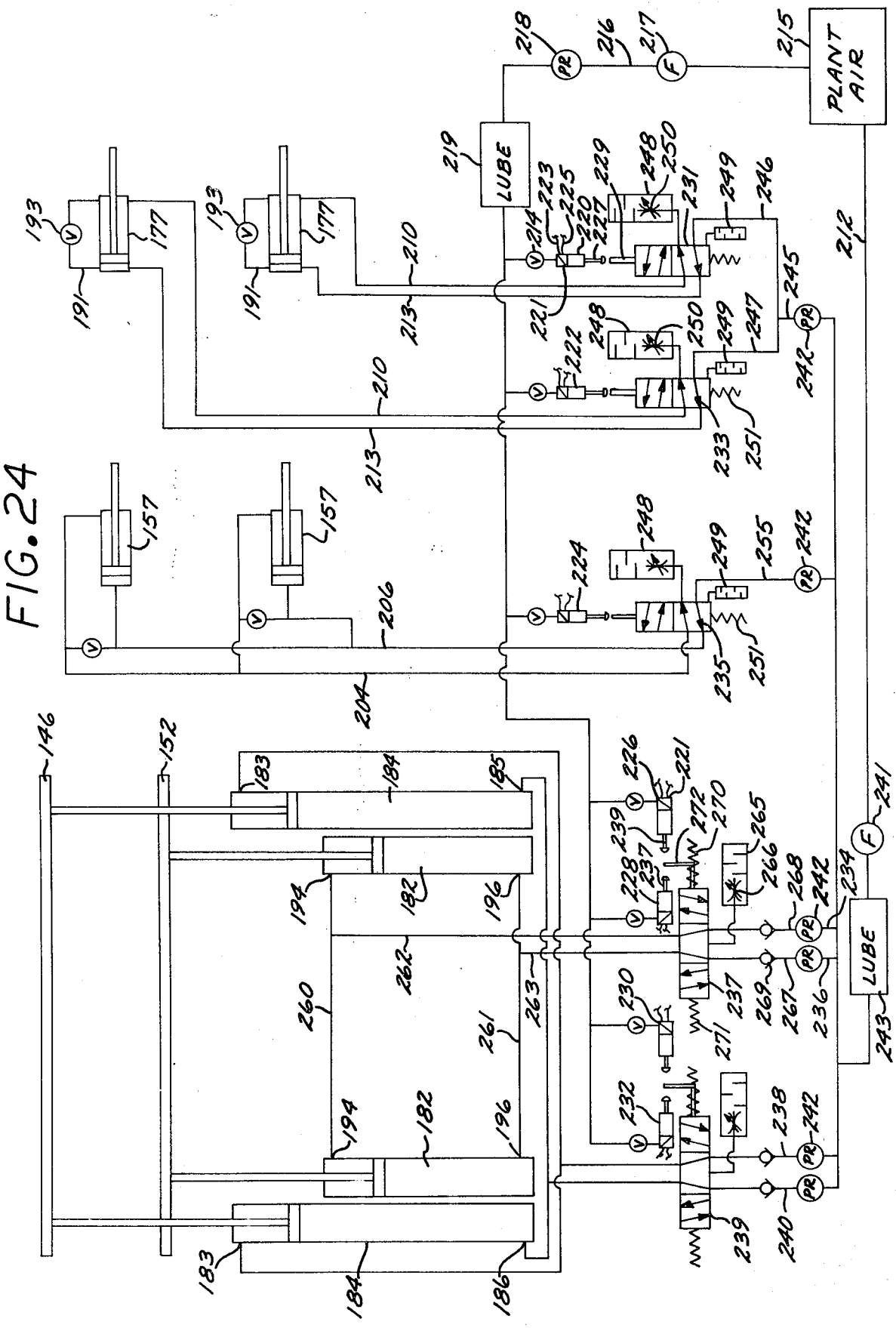
FIG. 24 illustrates the actuator mechanisms for the sheet clamping and product ejecting mechanisms.

Referring now to FIG. 24, the fluid pressure actuating system for effecting vertical transport of the open frameworks and for operating the clamping assemblies and ejector means will be described. The piston and cylinder actuators 182 and 184 effect vertical movement of the open frameworks at the molding and loading-unloading stations and suitable valve and actuator assemblies are provided at each of these stations to control vertical movement of the open frameworks. In FIG. 24, only one such assembly is shown with one set of the vertical transport actuators, piston and cylinder assemblies, 182 and 184. Since the illustrated apparatus has four sets of upper and lower open frameworks, a total of four such seta of vertical transport actuators are provided. Similarly, only two clamp actuators 177 and two frame expansion actuators 157 are shown. As apparent from FIG. 11, however, each open frameworks can support many clamp assemblies with their actuators 177 and, preferably, has four frame expansion actuators 159.

As illustrated, a suitable source of pressured actuating fluid, e.g., compressed air, is provided at a compressor station such as 215. A conduit 216 passes a portion of the pressured plant air through a filter such as 217 and pressure regulator 218 to a lubricating means 219 where the air is saturated with a lubricating oil. The resultant pressure fluid is then supplied to a plurality of electrically controlled pneumatic solenoids 220, 222, 224, 226, 228, 230 and 232. The fluid pressure is supplied to each of these solenoids through a suitable needle valve 214 and through an electrically controlled valve 221 which is normally closed but which can be opened by the application of an electrical potential between leads 223 and 225 to apply pneumatic pressure to a piston with the solenoid. Each solenoid has a plunger 227 which engages with a push rod 229 that is attached to the sliding piston of shuttle valve means 231, 233, 235, 237 and 239.

Another conduit 212, extends from the compressor station 215, through a filter 241, and lubricator 243. This line is connected to a plurality of branch conduits 245, 255, 234, 236, 238 and 240 which extend to the shuttle valves 231, 233, 235, 237 and 239. Each of the branch conduits is provided with suitable pressure regulator means 242.

Branch conduit 245 is subdivided into two subbranch conduits 246 and 247 which extend to shuttle valves 231 and 233, respectively. These lines are connected to the fluid pressure supply port of the shuttle valves. The exhaust port of the shuttle valves is connected to a suitable muffler means such as baffled compartment 248 which can be provided with a suitable variable orifice means 250 for controlling the flow rate of fluid exhausted from the control system. A second such muffler and vent system 249 is connected to the other exhaust port of the shuttle valve means 231 and 233.

Each shuttle valve includes a reciprocal piston with internal passageways for reversing the supply of pressure fluid from supply conduits 246 and 247 to either of flexible conduits 210 and 213 and for connecting the the other of these flexible conduits to its muffler and exhaust compartments 248 or 249. Each shuttle valve also has spring means 251 whereby the valve is urged into the illustrated position with the fluid pressure being supplied to conduit 210 to close the jaws of the clamping assemblies. As illustrated, the application of an electrical potential to leads 223 and 225 would be effective to cause the solenoids 220 and 222 to extend their levers 227 against the push rod 229 of the shuttle valves and reverse the application of fluid pressure from flexible conduit 210 to conduit 213, thereby opening the jaws of the clamping assemblies.

Fluid pressure is also applied through conduit 255 to shuttle valve 235 which is similar in construction to valves 231 and 233, previously discussed. This valve is also provided with exhaust muffler and vent compartments 248 and 249. Shuttle valve 235 is operative to reverse the supply of pneumatic pressure between conduits 204 and 206 which are connected to the actuators 157 of the ejection mechanism, As previously mentioned, the application of fluid pressure to line 206 is effective to contract the open frameworks into the sheet receiving and supporting positions whereas the application of fluid pressure to conduit 204 is effective to expand the open frameworks into the position where the sheets and molded product formed therein are ejected from the open frameworks.

Each of the frameworks such as 146 and 152, is provided with a pair of actuating mechanisms in the form of pistons and cylinders positioned to effect the vertical transport of these open frameworks. The lowermost open frameworks 152 is shown with actuators 182 which have cylinders having upper access port 194 and lower access ports 196. Similarly, the upper open frameworks 146 is provided with actuating mechanisms 184 and the cylinders of these mechanisms have lowermost ports 185 and upper ports 183. The ports 194 are connected by a common header conduit 260 and the lower ports 196 are connected by another common header conduit 261, each of the headers being connected to separate ports of the shuttle valve 237 by conduits 262 and 263. The shuttle valve 237 has three opposite ports; the center port is connected to a muffler and vent compartment 265 which is provided with internal valves and a variable orifice 266 for controlling the flow of exhaust fluid therethrough. The remaining two ports of the shuttle valve are connected to conduits 267 and 268 which have suitable check valves such as 269 and pressure control regulators such as 242. The shuttle valves have a plurality of internal passages which are effective in diverting the supply of fluid pressure to either or both of conduits 263 and 262 and, when only one of the conduits is connected to a source of fluid pressure, for connecting the remaining conduit to the muffler and exhaust compartment 262. The shuttle member of this valve is spring biased into a null position by springs 270 and 271 at opposite ends thereof which position the valve in the illustrated position. The shuttle valve has a push rod 272 extending therefrom which is positioned between the lever arms 237 and 239 of solenoids 226 and 228. These solenoids are similar to solenoids 220, 222 and 224, previously described and each includes electrically actuated valve means 221 which is effective in applying fluid pressure to the piston of the solenoid to cause extension of its lever into operating engagement with the push rod 272 of the shuttle valve. The application of an electrical potential to the leads of solenoids 226 or 228 can thereby be seen to be effective in moving the shuttle valve to either side of the null and illustrated position whereby fluid pressure can be applied to one side of the piston in the fluid actuators 182 to cause these pistons to raise or lower the open frameworks 152. When the open frameworks 152 has reached its desired position, the electrical potential applied to the leads of the solenoid is removed and the springs 270 and 271 are effective to urge the shuttle valve member into its null position, applying the pneumatic pressure to both sides of the pistons in the cylinders, thereby locking the pistons against further travel and insuring against any creeping of the pistons which could otherwise be cause by leaks in the pneumatic system. The upper open frameworks 146 is provided with an identical actuating system to that described with reference the open frameworks 152 and a description of the elements of this actuating mechanism is not repeated herein.

The invention has been described by reference to the presently preferred and illustrated mode of practice thereof. It is not intended that the invention be unduly restricted by this illustrated embodiment. Instead, it is intended that the invention be defined by the means its obvious equivalents set forth in the following claims.

We claim:

1. In a vacuum-forming machine having transfer means including at least one open frameworks formed of frame bar members for transferring sheets of thermoplastic to a heating station and positioning said sheets therein between heating elements where said sheets are heated to a forming temperatures and to a molding station and positioning said sheets therein between opposed die faces where said sheets are molded into a formed product, the improved sheet clamping means carried on said transfer means which comprises a clamping assembly carried on at least one of said frame bar members for engaging an edge of said thermoplastic sheet, including opposed jaws carried by said assembly to grip opposite sides of said sheet with at least one of said jaws being pivotally mounted on said clamping assembly and including a reciprocable piston and cylinder actuator therefore having fluid pressure ports at opposite ends of said cylinder, a source of pressure fluid, selector valve means and conduits between said source of pressure fluid, valve means and ports whereby pressure fluid can be applied to a selected one side of said piston and exhausted from the opposite side thereof and pressure fluid bleed means carried by said actuator whereby a continuous flow of pressure fluid can be maintained through said actuator.

2. The machine of claim 1 wherein said clamping means comprises a plurality of said clamping assemblies.

3. The machine of claim 2 wherein said clamp assemblies are modular units, each comprising a base bracket bearing opposed flange means surrounding the supporting bar member of said open frameworks and bearing locking means for fixedly securing said assembly to said bar member, a shelf extension therefrom defining the lower of said jaws and the upper of said jaws pivotally carried thereon.

4. The machine of claim 2 wherein a plurality of conduits are provided to interconnect the ports at the rear of a plurality of said actuators and a second plurality of conduits are provided to interconnect the ports at the front of a plurality of said actuators with the cylinder of one of said actuators bearing said fluid bleed means interconnecting its rear and front ports.

5. The machine of claim 1 wherein said pressure fluid bleed means comprises a second pair of ports, one each at opposite ends of said cylinder with conduit means interconnecting said ports and bearing flow control means.

6. The machine of claim 1 wherein the uppermost jaw bears a link member pivotally attached thereto and, at its opposite end, pivotally attached to said base bracket.

7. The machine of claim 1 wherein one end of the piston and cylinder actuator is connected to said uppermost jaw and its opposite end is connected to an arm dependent from said base bracket.

8. The machine of claim 1 wherein the upper jaw carries a plurality of downwardly dependent prongs.

9. The machine of claim 1 wherein said prongs bear threaded shanks engaged in tapped bores in said jaw whereby the force of their engagement with said thermoplastic sheet can be fixedly adjusted.

10. The machine of claim 1 wherein said transfer means comprises a carousel bearing a plurality of pairs of vertically spaced apart open frameworks rotatably mounted to move said pairs of frameworks between loading-unloading, heating and molding stations and wherein said selector valve means is located at said loading-unloading station.

11. The machine of claim 10 wherein said selector valve includes an electrically actuated pneumatic solenoid operative to move said selector valve to a position directing said pressure fluid to a selected side of the pistons of said actuators.

* * * * *